(12) United States Patent
Tedesco et al.

(10) Patent No.: US 10,731,618 B2
(45) Date of Patent: Aug. 4, 2020

(54) CAMERA BASED VEHICLE START-STOP FEATURE

(71) Applicant: MAGNA ELECTRONICS INC., Auburn Hills, MI (US)

(72) Inventors: Brian J. Tedesco, Novi, MI (US); Sai Sunil Charugundla Gangadhar, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/258,722

(22) Filed: Jan. 28, 2019

(65) Prior Publication Data

US 2019/0162151 A1    May 30, 2019

Related U.S. Application Data

(63) Continuation of application No. 15/617,218, filed on Jun. 8, 2017, now Pat. No. 10,190,560.
(Continued)

(51) Int. Cl.
*F02N 11/08* (2006.01)
*B62D 5/00* (2006.01)
(Continued)

(52) U.S. Cl.
CPC .......... *F02N 11/0803* (2013.01); *B60R 11/04* (2013.01); *B60T 7/18* (2013.01); *B60T 7/22* (2013.01); *B60T 13/00* (2013.01); *B62D 5/00* (2013.01); *F02N 11/0822* (2013.01); *F02N 11/0837* (2013.01); *G06K 9/00798* (2013.01);
(Continued)

(58) Field of Classification Search
CPC ............ F02N 11/0803; F02N 11/0837; F02N 11/0822; F02N 2200/125; F02N 2200/102; F02N 2200/12; B60T 7/22; B60T 7/18; B60T 13/00; B60T 2201/022; B60R 11/04; B60R 2011/0026; G06K 9/00825; G06K 9/00818; G06K 9/00798; G06K 9/78; B62D 5/00; B60W 10/06; B60W 10/30; B60W 10/184; B60W 30/18154;
(Continued)

(56) References Cited

U.S. PATENT DOCUMENTS 5,161,107 A    11/1992   Mayeaux et al.
5,550,677 A    8/1996    Schofield et al.
(Continued)

*Primary Examiner* — Hai H Huynh
(74) *Attorney, Agent, or Firm* — Honigman LLP

(57) ABSTRACT

A method of vehicular control includes providing a camera and a control at a vehicle, and maneuvering the vehicle along a road while capturing image data via the camera. Image data captured by the camera is processed at the control to determine presence of a stopping area ahead of the vehicle and being approached by the vehicle as the vehicle is maneuvered along the road. Responsive to determination of presence of the stopping area, the operating capacity of the vehicle engine is reduced so that the engine operates at reduced capacity as the vehicle moves toward and stops at the determined stopping area. After stopping the vehicle at the stopping area, the control determines if a hazard is present in the field of view of the camera. Responsive to determining that no hazard is present, the operating capacity of the engine is restored to its normal operating capacity.

20 Claims, 3 Drawing Sheets

Related U.S. Application Data

(60) Provisional application No. 62/345,460, filed on Jun. 3, 2016.

(51) Int. Cl.

| | | |
|---|---|---|
| *B60T 13/00* | (2006.01) | |
| *G06K 9/78* | (2006.01) | |
| *G06K 9/00* | (2006.01) | |
| *B60R 11/04* | (2006.01) | |
| *B60T 7/18* | (2006.01) | |
| *B60T 7/22* | (2006.01) | |
| *B60R 11/00* | (2006.01) | |

(52) U.S. Cl.
CPC ..... *G06K 9/00805* (2013.01); *G06K 9/00818* (2013.01); *G06K 9/00825* (2013.01); *G06K 9/78* (2013.01); *B60R 2011/0026* (2013.01); *B60T 2201/022* (2013.01); *F02N 2200/102* (2013.01); *F02N 2200/12* (2013.01); *F02N 2200/125* (2013.01)

(58) Field of Classification Search
CPC ....... B60W 30/18018; B60W 2540/10; B60W 2540/12; B60W 2420/42
USPC ........... 123/179.3, 179.4; 701/112, 113, 117, 701/118, 119
See application file for complete search history.

(56) References Cited

U.S. PATENT DOCUMENTS

| | | | |
|---|---|---|---|
| 5,670,935 | A | 9/1997 | Schofield et al. |
| 5,949,331 | A | 9/1999 | Schofield et al. |
| 6,463,900 | B1 | 10/2002 | Wakabayashi et al. |
| 6,516,262 | B2 | 2/2003 | Takenaga et al. |
| 6,629,515 | B1 | 10/2003 | Yamamoto et al. |
| 6,690,268 | B2 | 2/2004 | Schofield et al. |
| 6,693,517 | B2 | 2/2004 | McCarthy et al. |
| 6,728,623 | B2 | 4/2004 | Takenaga et al. |
| 7,398,076 | B2 | 7/2008 | Kubota et al. |
| 7,580,795 | B2 | 8/2009 | McCarthy et al. |
| 7,676,324 | B2 | 3/2010 | Bae |
| 7,698,053 | B2 | 4/2010 | Mori |
| 7,853,401 | B2 | 12/2010 | Hoetzer |
| 8,031,062 | B2 | 10/2011 | Smith |
| 8,078,379 | B2 | 12/2011 | Lu |
| 8,296,030 | B2 | 10/2012 | Luo et al. |
| 8,532,843 | B2 | 9/2013 | Nagura et al. |
| 8,594,912 | B2 | 11/2013 | Weaver |
| 8,606,455 | B2 | 12/2013 | Boehringer et al. |
| 8,694,192 | B2 | 4/2014 | Cullinane |
| 9,092,986 | B2 | 7/2015 | Salomonsson et al. |
| 9,318,020 | B2 | 4/2016 | Salomonsson et al. |
| 9,346,401 | B2 * | 5/2016 | Reichel ............... B60W 30/085 |
| 9,409,567 | B2 | 8/2016 | Otake |
| 9,563,809 | B2 | 2/2017 | Salomonsson et al. |
| 9,824,285 | B2 | 11/2017 | Salomonsson et al. |
| 9,926,881 | B2 | 3/2018 | Sangameswaran et al. |
| 10,190,560 | B2 | 1/2019 | Tedesco et al. |
| 2010/0070172 | A1 | 3/2010 | Kumar |
| 2010/0125402 | A1 | 5/2010 | Bansal et al. |
| 2010/0168992 | A1 | 7/2010 | Nakata |
| 2010/0292886 | A1 | 11/2010 | Szczerba et al. |
| 2011/0005486 | A1 | 1/2011 | Nakamura |
| 2012/0062743 | A1 | 3/2012 | Lynam et al. |
| 2012/0116632 | A1 | 5/2012 | Bechtel et al. |
| 2012/0218412 | A1 | 8/2012 | Dellantoni et al. |
| 2012/0277947 | A1 | 11/2012 | Boehringer et al. |
| 2013/0116915 | A1 | 5/2013 | Ferreira et al. |
| 2013/0222592 | A1 | 8/2013 | Gieseke |
| 2014/0218529 | A1 | 8/2014 | Mahmoud et al. |
| 2014/0277901 | A1 | 9/2014 | Ferguson et al. |
| 2014/0375476 | A1 | 12/2014 | Johnson et al. |
| 2015/0124096 | A1 | 5/2015 | Koravadi |
| 2015/0158499 | A1 | 6/2015 | Koravadi |
| 2015/0251599 | A1 | 9/2015 | Koravadi |
| 2015/0284008 | A1 | 10/2015 | Tan et al. |
| 2015/0352953 | A1 | 12/2015 | Koravadi |
| 2016/0036917 | A1 | 2/2016 | Koravadi et al. |
| 2016/0210853 | A1 | 7/2016 | Koravadi |

\* cited by examiner

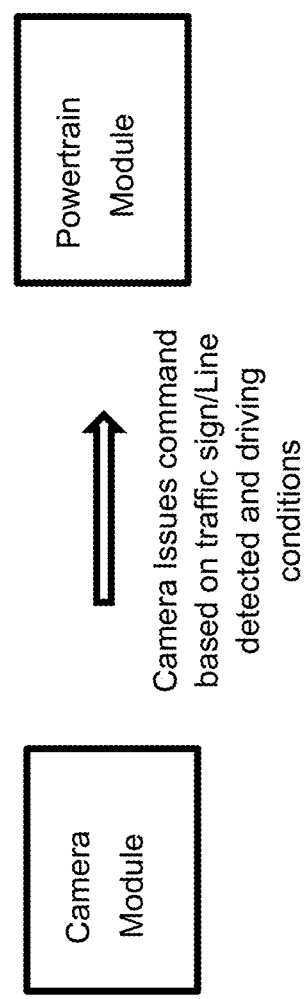

CAMERA BASED VEHICLE START-STOP FEATURE

CROSS REFERENCE TO RELATED APPLICATIONS

The present application is a continuation of U.S. patent application Ser. No. 15/617,218, filed Jun. 8, 2017, now U.S. Pat. No. 10,190,560, which claims the filing benefits of U.S. provisional application Ser. No. 62/345,460, filed Jun. 10, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras to capture image data representative of images exterior and forward of the vehicle, and provides a camera based start-stop system or feature that is operable to shut off the engine as the vehicle coasts towards a stopping area (such as at a stop sign or stop line or intersection or the like). The processor processes image data captured by the camera to determine when the vehicle is approaching a stop sign or stop line or the like at a road or intersection and, responsive to a determination that the driver of the vehicle releases the accelerator, such as to coast towards the stop area, the system controls a powertrain module of the vehicle to shut down the engine. After the vehicle is stopped, and responsive to the driver releasing the brake pedal, the system controls the powertrain module to start the engine to restore normal operation of the vehicle, whereby the driver drives the vehicle through the intersection. The system of the present invention thus provides enhanced fuel economy for the vehicle by shutting down the engine in situations where the vehicle is simply coasting towards a stopping location.

These and other objects, advantages, purposes and features of the present invention will become apparent upon review of the following specification in conjunction with the drawings.

BRIEF DESCRIPTION OF THE DRAWINGS

FIG. 3 is a block diagram of the operation of the camera based start-stop system.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
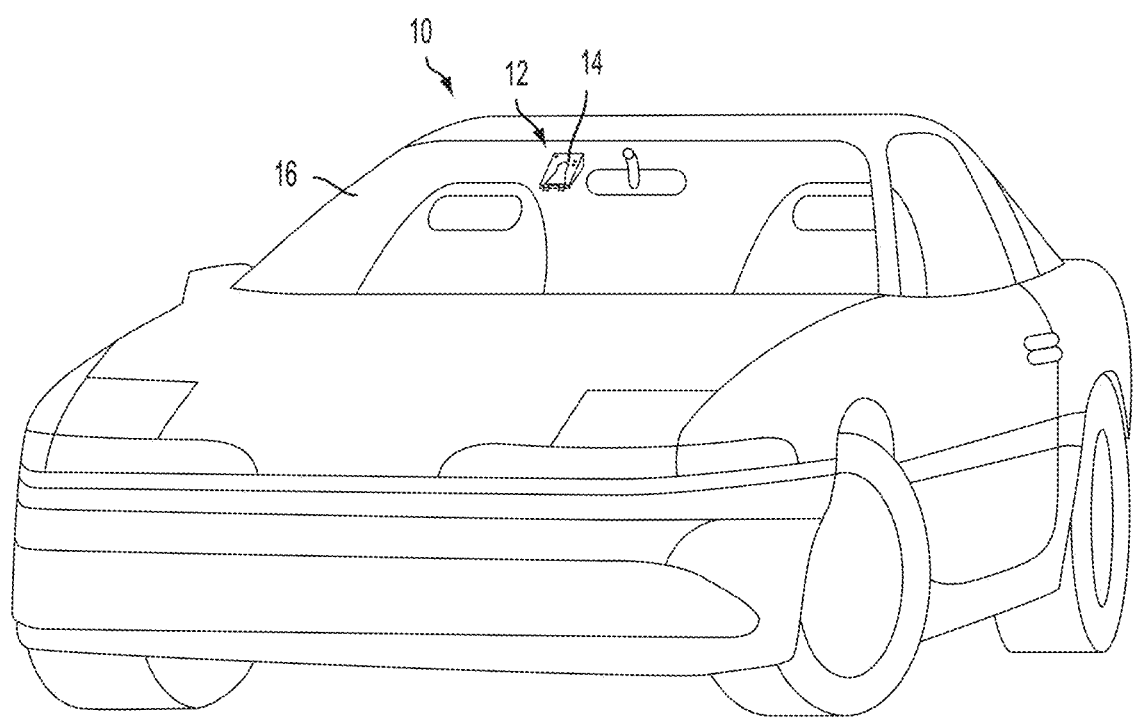
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a forward facing imaging sensor or camera 14 disposed at the windshield 16 of the vehicle and view through the windshield and forward of the vehicle (FIG. 1). The camera may capture image data for use with a machine vision system (such as for traffic sign recognition, headlamp control, pedestrian detection, collision avoidance, lane marker detection and/or the like). The vision system 12 includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Figure 2:
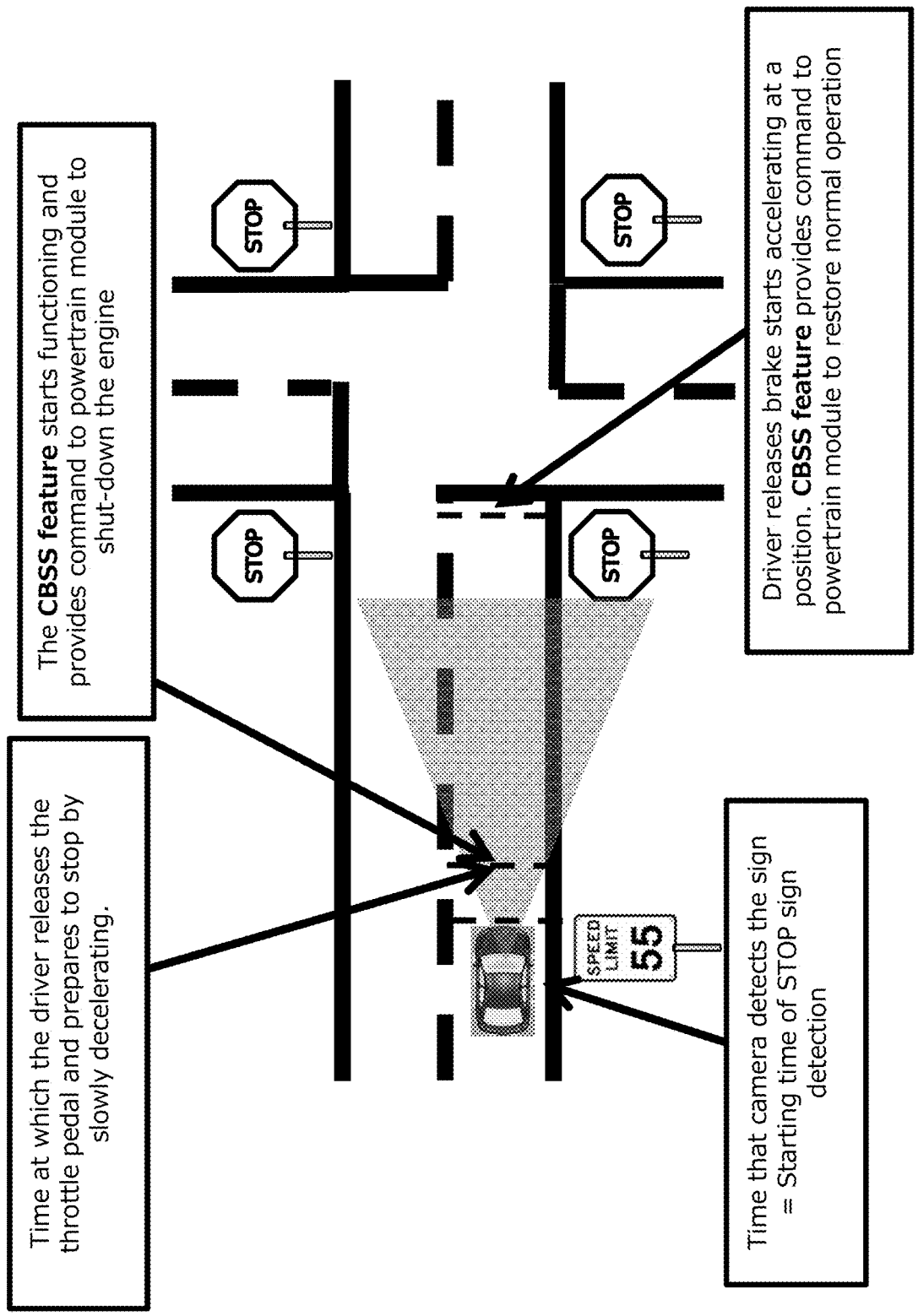
FIG. 2 is diagram showing operation of the camera based start-stop system of the present invention.

As shown in FIG. 2, the processor processes image data captured by the camera 14 to determine when the vehicle is approaching a stopping area, such as via determination of a stop sign or stop line or stop (red) light or the like at a road or intersection, or determination of a stopped vehicle or object ahead of the equipped vehicle. Optionally, the system may determine the presence of stopping area and distances to the beginning of the stopping area and an end of the stopping area. Responsive to determination of the stopping area being approached by the vehicle, and responsive to a determination that the driver of the vehicle releases the accelerator, such as to coast and/or decelerate towards the stop area, the system begins to control a powertrain module (FIG. 3) of the vehicle to at least partially shut down the vehicle's engine (for example, the system may shut off the vehicle's engine or may operate the engine at reduced capacity, such as by reducing the number of cylinders being utilized or fired). The vehicle is then stopped by application of the brakes, either by the driver or optionally by the control system (such as an automatic braking system or semi-autonomous control system of the vehicle). When the vehicle is stopped at the stop area, the driver typically holds the brake pedal down (per normal driving methods). Responsive to the driver releasing the brake pedal, the system controls the powertrain module to start the engine to restore normal operation of the vehicle, whereby the driver drives the vehicle through the intersection.

Optionally, the control may also be responsive to image processing of image data captured by one or more cameras of the vehicle, whereby the system may not start the engine if a hazard is detected at the intersection (such as a vehicle rapidly approaching the intersection with no sign of stopping or such as a pedestrian detected that is about to enter the projected path of travel of the vehicle at the intersection). In such a case, the system may determine that an area ahead of the vehicle before the intersection or pedestrian is a stopping area.

The forward viewing camera module mounted at the windshield of the vehicle has the ability to detect and recognize traffic signs, such as via image processing of image data captured by the forward viewing camera. The driver may be alerted to the presence of the detected traffic signs (such as via a display or audible alert or the like). A principal input to the camera based start-stop (CBSS) feature is the detection of a "STOP" sign/line/light ahead of the vehicle. The camera will detect the "STOP" sign/line/light ahead of the intersection at an appropriate timing based on the vehicle speed and distance to the "STOP" sign/line/light.

On detection of the STOP sign/line/light, and responsive to the driver releasing the vehicle's throttle pedal, the CBSS feature enables the start-stop feature of the vehicle and the control or system issues a command to power train module to cut-off the engine (based on Start-Stop feature functionality) even before the vehicle comes to a complete stop. On driver intervention, the Start-Stop feature can be disabled. Optionally, the system may continue to power (such as via battery power or the like) power steering and/or power braking of the vehicle, to assist the driver's control of the vehicle when the engine is shut down while the vehicle is still moving. Optionally, the control or system may only partially shut down the engine (such as switching to only two cylinders running instead of the usual four cylinders or six cylinders or more) such that the engine operates at reduced or minimal capacity to reduce fuel consumption when high engine power is not needed.

The CBSS feature of the present invention thus increases the fuel economy of the vehicle, since the engine is not running when the vehicle is simply coasting towards a stop sign or stop line or stop light ahead of the vehicle. Optionally, in addition to stop signs/lines, the start-stop feature of the present invention may also be applicable to the vehicle approaching an intersection with traffic lights and/ow the vehicle approaching traffic jams or stopped cars or groups of pedestrians or other objects or obstacles detected ahead of the vehicle and in a projected path of travel of the vehicle.

The determination of the vehicle approaching a stopping area may also be made in part responsive to a communication from an external source, such as another vehicle or an infrastructure (or from a GPS system of the vehicle). For example, the start-stop system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. U.S.-2014-0375476; U.S.-2014-0218529; U.S.-2013-0222592; U.S.-2012-0218412; U.S.-2012-0062743; U.S.-2015-0251599; U.S.-2015-0158499; U.S.-2015-0124096; U.S.-2015-0352953; U.S.-2016-0036917 and/or U.S.-2016-0210853, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. U.S.-2014-0340510; U.S.-2014-0313339; U.S.-2014-0347486; U.S.-2014-0320658; U.S.-2014-0336876; U.S.-2014-0307095; U.S.-2014-0327774; U.S.-2014-0327772; U.S.-2014-0320636; U.S.-2014-0293057; U.S.-2014-0309884; U.S.-2014-0226012; U.S.-2014-0293042; U.S.-2014-0218535; U.S.-2014-0218535; U.S.-2014-0247354;

U.S.-2014-0247355; U.S.-2014-0247352; U.S.-2014-0232869; U.S.-2014-0211009; U.S.-2014-0160276; U.S.-2014-0168437; U.S.-2014-0168415; U.S.-2014-0160291; U.S.-2014-0152825; U.S.-2014-0139676; U.S.-2014-0138140; U.S.-2014-0104426; U.S.-2014-0098229; U.S.-2014-0085472; U.S.-2014-0067206; U.S.-2014-0049646; U.S.-2014-0052340; U.S.-2014-0025240; U.S.-2014-0028852; U.S.-2014-005907; U.S.-2013-0314503; U.S.-2013-0298866; U.S.-2013-0222593; U.S.-2013-0300869; U.S.-2013-0278769; U.S.-2013-0258077; U.S.-2013-0258077; U.S.-2013-0242099; U.S.-2013-0215271; U.S.-2013-0141578 and/or U.S.-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the camera may comprise a forward facing camera, such as disposed at a windshield electronics module (WEM) or the like. The forward facing camera may utilize aspects of the systems described in U.S. Pat. Nos. 8,256,821; 7,480,149; 6,824,281 and/or 6,690,268, and/or U.S. Publication Nos. U.S.-2015-0327398; U.S.-2015-0015713; U.S.-2014-0160284; U.S.-2014-0226012 and/or U.S.-2009-0295181, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. U.S.-2012-0162427; U.S.-2006-0050018 and/or U.S.-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. U.S.-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method of vehicular control, said method comprising:
providing a camera at a vehicle equipped with an engine, a powertrain system, a steering system and a braking system, wherein providing the camera comprises mounting the camera at the vehicle so as to have a field of view exterior and forward of the vehicle;
providing a control at the vehicle, the control comprising a data processor operable to process image data captured by the camera;
maneuvering the vehicle along a road;
capturing image data via the camera as the vehicle is maneuvered along the road;
processing at the control image data captured by the camera;
determining, via processing at the control of image data captured by the camera, presence of a stopping area ahead of the vehicle and being approached by the vehicle as the vehicle is maneuvered along the road;
responsive to determination of presence of the stopping area ahead of the vehicle and being approached by the vehicle, and while the vehicle is moving toward the determined stopping area, reducing via the control operating capacity of the engine of the vehicle so that the engine operates at reduced capacity as the vehicle moves toward the determined stopping area;
stopping the vehicle at the stopping area;
after stopping the vehicle at the stopping area, determining via processing at the control of image data captured by the camera if a hazard is present in the field of view of the camera; and
responsive to determining that no hazard is present in the field of view of the camera, controlling via the control the operating capacity of the engine to restore normal operating capacity of the engine.

2. The method of claim 1, comprising, responsive to determining that a hazard is present in the field of view of the camera, controlling the operating capacity of the engine to limit movement of the vehicle at the stopping area.

3. The method of claim 1, wherein reducing operating capacity of the engine comprises turning off the engine.

4. The method of claim 3, comprising preventing operation of the engine responsive to determining that a hazard is present in the field of view of the camera.

5. The method of claim 4, wherein the determined hazard present in the field of view of the camera comprises a pedestrian at the road ahead of the vehicle.

6. The method of claim 3, comprising powering a power steering system and a power braking system of the vehicle via a battery when the engine is operating at reduced capacity.

7. The method of claim 1, wherein determining the stopping area comprises determining presence of an intersection ahead of the vehicle and being approached by the vehicle.

8. The method of claim 1, wherein determining the stopping area comprises determining presence of at least one selected from the group consisting of (i) a stop sign ahead of the vehicle and being approached by the vehicle, (ii) a stopping line on the road ahead of the vehicle and being approached by the vehicle and (iii) a traffic light ahead of the vehicle and being approached by the vehicle.

9. The method of claim 1, wherein the stopping area is determined responsive at least in part to a wireless communication from a system remote from the vehicle.

10. The method of claim 1, wherein reducing operating capacity of the engine comprises reducing operating capacity of the engine by controlling a powertrain module of the vehicle.

11. The method of claim 1, wherein reducing operating capacity of the engine comprises partially shutting down the engine.

12. A method of vehicular control, said method comprising:
   providing a camera at a vehicle equipped with an engine, a powertrain system, a steering system and a braking system, wherein providing the camera comprises mounting the camera at the vehicle so as to have a field of view exterior and forward of the vehicle;
   providing a control at the vehicle, the control comprising a data processor operable to process image data captured by the camera;
   maneuvering the vehicle along a road;
   capturing image data via the camera as the vehicle is maneuvered along the road;
   processing at the control image data captured by the camera;
   determining, via processing at the control of image data captured by the camera, presence of a stopping area ahead of the vehicle and being approached by the vehicle as the vehicle is maneuvered along the road;
   wherein determining the stopping area comprises determining presence of an intersection ahead of the vehicle and being approached by the vehicle;
   responsive to determination of presence of the stopping area ahead of the vehicle and being approached by the vehicle, and while the vehicle is moving toward the determined stopping area, reducing via the control operating capacity of the engine of the vehicle so that the engine operates at reduced capacity as the vehicle moves toward the determined stopping area;
   stopping the vehicle at the stopping area;
   after stopping the vehicle at the stopping area, determining via processing at the control of image data captured by the camera if a pedestrian is present in the field of view of the camera and at the road ahead of the vehicle; and
   responsive to determining that no pedestrian is present in the field of view of the camera and at the road ahead of the vehicle, controlling via the control the operating capacity of the engine to restore normal operating capacity of the engine.

13. The method of claim 12, wherein, responsive to determining that a pedestrian is present in the field of view of the camera and at the road ahead of the vehicle, controlling the operating capacity of the engine to limit movement of the vehicle at the stopping area.

14. The method of claim 12, wherein reducing operating capacity of the engine comprises turning off the engine, and wherein said method comprises preventing via the control operation of the engine responsive to determining that a pedestrian is present in the field of view of the camera and at the road ahead of the vehicle.

15. The method of claim 12, wherein the stopping area is determined responsive at least in part to a wireless communication from a system remote from the vehicle.

16. A method of vehicular control, said method comprising:
   providing a camera at a vehicle equipped with an engine, a powertrain system, a steering system and a braking system, wherein providing the camera comprises mounting the camera at the vehicle so as to have a field of view exterior and forward of the vehicle;
   providing a control at the vehicle, the control comprising a data processor operable to process image data captured by the camera;
   maneuvering the vehicle along a road;
   capturing image data via the camera as the vehicle is maneuvered along the road;
   processing at the control image data captured by the camera;
   determining, via processing at the control of image data captured by the camera, presence of a stopping area ahead of the vehicle and being approached by the vehicle as the vehicle is maneuvered along the road;
   wherein determining the stopping area comprises determining presence of at least one selected from the group consisting of (i) a stop sign ahead of the vehicle and being approached by the vehicle, (ii) a stopping line on the road ahead of the vehicle and being approached by the vehicle and (iii) a traffic light ahead of the vehicle and being approached by the vehicle;
   responsive to determination of presence of the stopping area ahead of the vehicle and being approached by the vehicle, and while the vehicle is moving toward the determined stopping area, reducing via the control operating capacity of the engine of the vehicle so that the engine operates at reduced capacity as the vehicle moves toward the determined stopping area;
   stopping the vehicle at the stopping area;
   after stopping the vehicle at the stopping area, determining via processing at the control of image data captured by the camera if a pedestrian is present in the field of view of the camera and at the road ahead of the vehicle; and
   responsive to determining that no pedestrian is present in the field of view of the camera and at the road ahead of the vehicle, controlling via the control the operating capacity of the engine to restore normal operating capacity of the engine.

17. The method of claim 16, comprising, responsive to determining that a pedestrian is present in the field of view of the camera and at the road ahead of the vehicle, controlling the operating capacity of the engine to limit movement of the vehicle at the stopping area.

18. The method of claim 16, wherein reducing operating capacity of the engine comprises turning off the engine, and wherein said method comprises preventing via the control operation of the engine responsive to determining that a pedestrian is present in the field of view of the camera and at the road ahead of the vehicle.

19. The method of claim 16, wherein the stopping area is determined responsive at least in part to a wireless communication from a system remote from the vehicle.

20. The method of claim 16, wherein reducing operating capacity of the engine comprises turning off the engine, and wherein said method comprises powering a power steering system and a power braking system of the vehicle via a battery when the engine is operating at reduced capacity.

* * * * *